(12) United States Patent
Vera

(10) Patent No.: US 8,037,092 B2
(45) Date of Patent: Oct. 11, 2011

(54) SYSTEM AND METHOD FOR MERGING MANUAL PARAMETERS WITH PREDEFINED PARAMETERS

(75) Inventor: Pedro Sanchez Vera, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1362 days.

(21) Appl. No.: 11/244,946

(22) Filed: Oct. 5, 2005

(65) Prior Publication Data

US 2007/0078882 A1    Apr. 5, 2007

(51) Int. Cl.
*G06F 17/30* (2006.01)
*G06F 17/00* (2006.01)

(52) U.S. Cl. .................. 707/778; 707/829; 707/956
(58) Field of Classification Search .................. 707/102
See application file for complete search history.

(56) References Cited

U.S. PATENT DOCUMENTS

| | | | | |
|---|---|---|---|---|
| 4,686,623 A | | 8/1987 | Wallace | 364/300 |
| 4,992,971 A | * | 2/1991 | Hayashi | 717/140 |
| 5,826,256 A | | 10/1998 | Devanbu | 707/4 |
| 5,963,742 A | | 10/1999 | Williams | 395/708 |
| 6,058,235 A | | 5/2000 | Hiramatsu et al. | 385/135 |
| 6,134,709 A | * | 10/2000 | Pratt | 717/143 |
| 6,243,862 B1 | | 6/2001 | Lebow | 717/4 |
| 6,263,376 B1 | * | 7/2001 | Hatch et al. | 719/310 |
| 6,286,035 B1 | * | 9/2001 | Gillis et al. | 709/206 |
| 6,877,156 B2 | | 4/2005 | Osborne et al. | 717/143 |
| 2004/0060007 A1 | * | 3/2004 | Gottlob et al. | 715/513 |
| 2004/0260683 A1 | * | 12/2004 | Chan et al. | 707/3 |
| 2006/0005122 A1 | * | 1/2006 | Lemoine | 715/513 |

* cited by examiner

*Primary Examiner* — Yicun Wu
(74) *Attorney, Agent, or Firm* — Kunzler Needham Massey & Thorpe

(57) ABSTRACT

A system and method are disclosed for merging manual parameters with predefined parameters. The system includes a parse module configured to receive a command string having multiple nested manual parameters and a build module configured to generate a parameter tree having manual parameter nodes and predefined parameter nodes. The system may also include a search module configured to compare manual parameter nodes to predefined parameter nodes to identify matching parameter contexts, and a command module configured to generate a command string. The method includes receiving a command string having multiple nested manual parameters, identifying manual parameters within the command string, and generating a parameter tree having manual parameter nodes and predefined parameter nodes. The method also includes comparing manual parameter nodes to predefined parameter nodes to identify parameter nodes having a matching parameter context, and generating a command string.

20 Claims, 6 Drawing Sheets

SYSTEM AND METHOD FOR MERGING MANUAL PARAMETERS WITH PREDEFINED PARAMETERS

BACKGROUND OF THE INVENTION

1. Field of the Invention

This invention relates to computer application programs, and more particularly the present invention relates to merging manual parameters with predefined parameters to form a command string.

2. Description of the Related Art

An Information Management System (IMS) is a hierarchical database management system that has wide spread usage in many large enterprises where high transaction volume, reliability, availability and scalability are of the utmost importance. While IMS provides the software and interfaces for running the businesses of many of the world's large corporations, a company typically tailors specific application programs in order to have IMS perform proprietary or custom work for the enterprise. IMS application programs are typically coded in COBOL, PL/I, C, PASCAL or assembly language.

Also available for IMS is a system management application having an Interactive System Productivity Facility (ISPF) panel interface with the ability to manage a group of IMSs from a Time Sharing Options (TSO) Single Point of Control (SPOC). With a SPOC interface, commands may be submitted to an operations manager. The operations manager controls the operations of the group of IMSs (hereinafter "IMSplex") and also provides an application programming interface (API) through which commands can be issued and responses received. The SPOC interfaces include the TSO SPOC, the Restructured Extended Executor SPOC API, and the IMS Control Center. Users may also write additional applications to submit commands. By using one of the SPOC interfaces, for example the TSO SPOC, the user is able to write single points of control that communicate with the operations manager.

This IMS TSO SPOC is a software program that is configured to manage all IMS systems within the IMSplex. With the SPOC, commands may be issued to all members of an IMSplex at the same time. There can be more than one type of SPOC in an IMSplex, and there can be any number of SPOCs active. TSO SPOC communicates with one operations manager (OM) address space. The OM then communicates with all IMS address spaces in the IMSplex through a Structured Call Interface (SCI).

The IMS TSO SPOC provides several functions to an IMSplex. First, the IMS TSO SPOC presents a single system image for an IMSplex by allowing the user to issue commands to all IMSs in the IMSplex from a single console. Additionally SPOC displays consolidated command responses from multiple IMS address spaces. SPOC may also be configured to send a message to an IMS terminal connected to any IMS control region in the IMSplex.

Generally, commands in the IMS TSO SPOC application are manually entered on a command line prompt. A user may define command shortcuts and thereby reduce the length of commands. A combination of manually entered commands and predefined parameter commands may be utilized in issuing a complete command.

The IMS operator command syntax supports various parameters and the commands can be quite long. To help the operator, the IMS TSO SPOC allows the user to predefine certain parameters using a shortcut. When the user issues a short command string the TSO SPOC will combine both the necessary elements of the short manually typed string and the necessary elements of the user's predefined or redefined default parameters to compose a complete command.

The TSO SPOC does not simply append the predefined parameters to the entered command, but makes possible a merging of typed manual parameters with the predefined parameters. The shortcut may include typed manual parameters that are to override predefined parameters in the shortcut. This allows the user to change values of existing predefined parameters or add new parameters to the command, without reprogramming the shortcuts.

However, current TSO SPOC implementations do not account for multiple levels of nested parameters. Typically, the nested levels are indicated by delimiters such as a pair of parenthesis. Descendent levels of nesting are indicated by a parenthesis pair within an external parenthesis pair. For example, a command may include manual parameters within a parenthesis set which are also within a pair of parenthesis.

Current TSO SPOC implementations are unable to properly identify parameters at different nesting levels because the parameters often have the same name or token that identifies the parameter. However, parameter nesting results in parameters of the same name having a different context or meaning. Current TSO SPOC implementations are unable to identify this context distinction. So, the user is unable to use nested parenthesis in the command string with current IMS. The user is also unable to change values of existing predefined parameters or add new parameters to the command string when the parameters are found at a different level. This limitation of current TSO SPOC implementations severely restricts the value and benefit of the shortcut feature in the TSO SPOC implementations.

From the foregoing discussion, it should be apparent that a need exists for a system and method that will parse TSO SPOC command strings and merge parameters regardless of the amount of parameter nesting involved. Beneficially, such a system and method would eliminate the problem that exists with multiple levels of parameters and nested parenthesis.

SUMMARY OF THE INVENTION

The present invention has been developed in response to the present state of the art, and in particular, in response to the problems and needs in the art that have not yet been fully solved by currently available information management systems. Accordingly, the present invention has been developed to provide a system, and method for merging manual parameters with predefined parameters that overcome many or all of the above-discussed shortcomings in the art.

The system for merging manual parameters with predefined parameters is provided with a logic unit containing a plurality of modules configured to functionally execute the necessary steps. These modules in the described embodiments include a parse module configured to receive a command string having multiple nested manual parameters and configured to identify manual parameters within the command string, and a build module configured to generate a parameter tree having manual parameter nodes, each manual parameter node representing one manual parameter, the parameter tree further comprising predefined parameter nodes, each predefined parameter node representing one predefined parameter.

In a further embodiment, the system also includes a search module configured to compare manual parameter nodes to predefined parameter nodes to identify parameter nodes having a matching parameter context, and a command module configured to generate a command string comprising at least one parameter node having a matching parameter context. The command string may also include at least one parameter node having a nonmatching parameter context. The search module may also be configured to identify the parameter context match by identifying a match between a parent node of a manual parameter node and a parent node of a predefined parameter node.

The match between the parent node of the manual parameter node and the parent node of the predefined parameter node may comprise matching tokens of the parent node of the manual parameter node and the parent node of the predefined parameter node. In one embodiment, the parameter context match comprises a manual parameter that represents the same meaning as a predefined parameter such the command module overrides the predefined parameter with the manual parameter in defining the command string. Furthermore, the non-matching parameter context comprises a predefined parameter having no corresponding manual parameter such that the command module includes the predefined parameter in the command string.

In one embodiment, the search module traverses the parameter tree in order according to a depth-first traversal protocol. Additionally, the search module is configured to mark a manual parameter node having a matched parameter context and a predefined parameter node having a non-matching parameter context such that the command module can readily identify matched parameter context nodes and non-matching parameter context nodes.

In a further embodiment the build module is configured to create a descendent level of manual parameter nodes within the parameter tree for each nested manual parameter and create a descendent level of predefined parameter nodes within the parameter tree for each nested predefined parameters.

A method of the present invention is also presented for merging manual parameters and predefined parameters. The method in the disclosed embodiments substantially includes the steps necessary to carry out the functions presented above with respect to the operation of the described system. In one embodiment, the method includes receiving a command string having a plurality of nested manual parameters and identifying manual parameters within the command string, and generating a parameter tree having manual parameter nodes, each manual parameter node representing one manual parameter, the parameter tree further comprising predefined parameter nodes, each predefined parameter node representing one predefined parameter.

The method may also include comparing manual parameter nodes to predefined parameter nodes to identify parameter nodes having a matching parameter context, and generating a command string comprising at least one manual parameter from a manual parameter node having a matching parameter context and at least one predefined parameter from a predefined parameter node having a non-matching parameter context. In a further embodiment, the method includes identifying the parameter context match by identifying a match between a parent node of a manual parameter node and a parent node of a predefined parameter node.

In one embodiment, the method matches tokens of the parent node of the manual parameter node and the parent node of the predefined parameter node, and overrides the predefined parameter in generating the command string. Alternatively, the method may include at least one predefined parameter from a predefined parameter node having a non-matching parameter context in the command string. In a further embodiment, the method includes traversing the manual parameter nodes within the parameter tree and the predefined parameter nodes within the parameter tree in order according to a depth-first traversal protocol.

The method may also include marking a manual parameter node having a matched parameter context and a predefined parameter node having a non-matching parameter context such that the command module can readily identify matched parameter context nodes and non-matching parameter context nodes. In a further embodiment, the method includes creating a descendent level of manual parameter nodes within the parameter tree for each nested level of manual parameters and creating a descendent level of predefined parameter nodes within the parameter tree for each nested level of predefined parameters.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
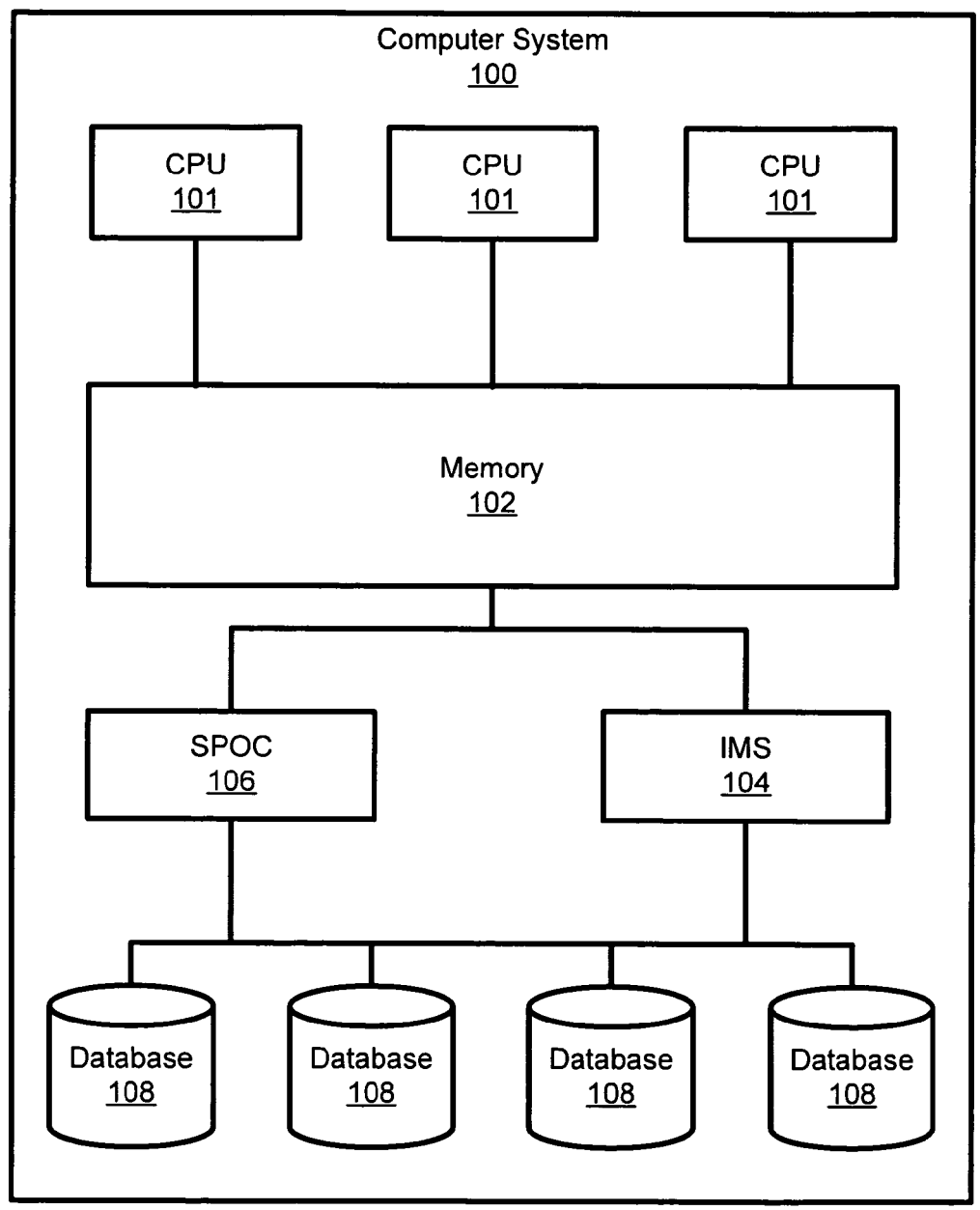
FIG. 1 is a schematic block diagram illustrating one embodiment of a computer system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a computer system 100 in accordance with the present invention. In one embodiment, the computer system 100 comprises a mainframe computer system. One example of a mainframe computer system compatible with the present invention is the zSeries mainframe manufactured by International Business Machines of Armonk, N.Y. The system 100 may comprise one or more Central Possessing Units (CPUs) 101 and one or more memory module 102. The CPUs 101 are configured to operate together in concert with memory modules 102 in order to execute a variety of tasks.

In accordance with techniques known in the art, other components may be utilized with the computer system 100, such as input/output devices comprising direct access storage devices (DASDs), printers, tapes, etc. (not shown). Although the preferred embodiment is described in a particular hardware environment, those skilled in the art will recognize and appreciate that this is meant to be illustrative and not restrictive of the present invention. Accordingly, other alternative hardware environments may be used without departing from the scope of the present invention.

The computer system 100 may also include an Information Management System (IMS) module 104 configured to manage a database 108 and/or handle other transaction processing. A database 108 is a collection of interrelated data items, stored once and organized in a form for easy retrieval. The IMS module 104 is configured to store, organize, select, modify, and extract data from the database 108. In one embodiment, the computer system 100 comprises a Single Point Of Control (SPOC) module 106 configured to interact with a user and allow the user to define default parameters (referred to herein as predefined parameters) when commands are issued to the IMS module 104.

The SPOC module 106 may be configured to manage a plurality of IMS modules 104, often referred to collectively as an IMSplex. The SPOC module 106 is further configured to merge the predefined parameters with manually entered parameters.

Figure 2:
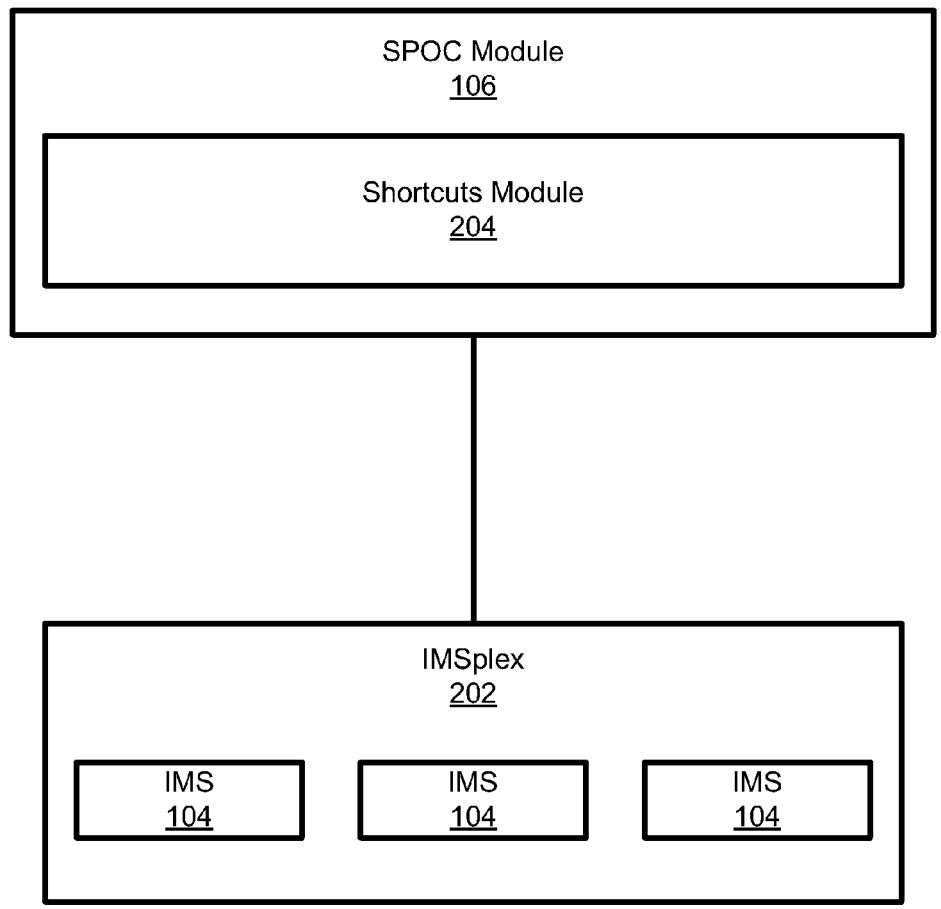
FIG. 2 is a schematic block diagram illustrating one embodiment of an IMSplex in accordance with the present invention.

FIG. 2 is a schematic block diagram illustrating one embodiment of an IMSplex 202 in accordance with the present invention. As described above, the SPOC module 106 may be configured to control an IMSplex 202, the IMSplex 202 having a plurality of IMS modules 104. Controlling an IMSplex 202 by way of a SPOC module 106 is well known to those skilled in the art of IMS management and will not be discussed further herein.

The SPOC module 106, in one embodiment, is further configured with a shortcut module 204 configured to maintain a list of predefined default parameters for commands the user enters. Preferably, the predefined default parameters are associated with a shortcut value which is also the same as the name of the command for which the default parameters will be used. The user may specify the shortcut value and the predefined default parameters corresponding to the shortcut value.

Figure 3:
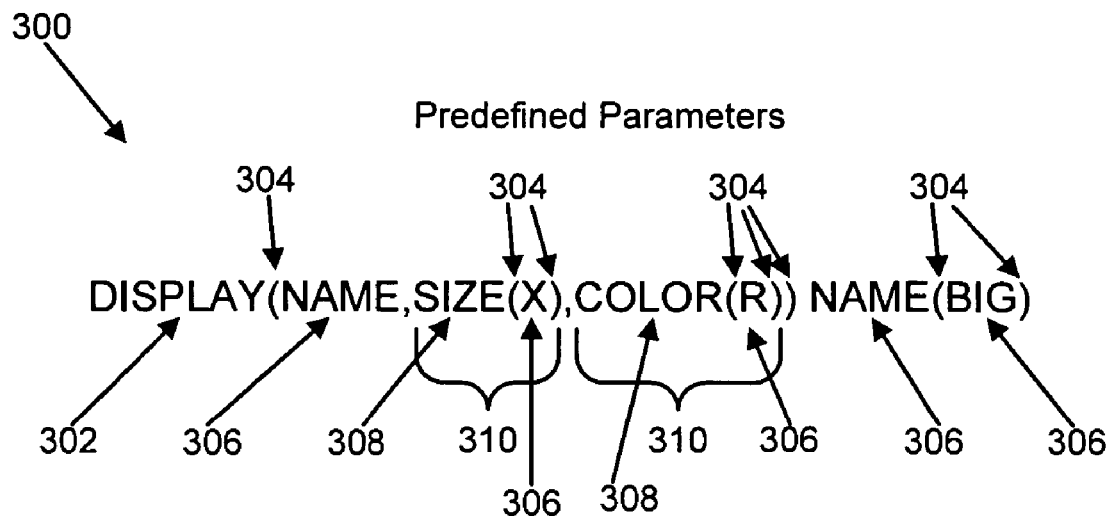
FIG. 3 is a schematic block diagram illustrating one embodiment of a command in accordance with the present invention.

FIG. 3 is a schematic block diagram illustrating one embodiment of a command 300 in accordance with the present invention. In one embodiment, the command 300 comprises a verb 302. The verb 302 is the first command element and identifies the action to be taken. In the depicted embodiment, the verb 302 is "DISPLAY." In a further embodiment, parens 304 surround parameters 306 of the verb 302. Parameters 306 may include names of resources, such as IMS identifiers, databases, IMS reserved parameters, keywords, data values, etc.

A pair of matching parens 304, or parenthesis, define a command level. A verb 302 or keyword 308 entered within parenthesis 304 is a "nested" command 310. Commands 300 may comprise multiple nested commands 310. Parens 304 may separate different levels of nested commands 310, or alternatively the parens 304 may be replaced by another delimiter which may be a space, equal sign, comma, a blank, a comma followed by a blank, etc. Examples of nested commands 310 may include "SIZE(X)" and "COLOR(R)" as depicted in FIG. 3. As depicted, the parameters "NAME, SIZE(X), COLOR(R)" are nested within the "DISPLAY" verb 302. The "DISPLAY" verb 302 may include multiple nested verbs 302, parameters 306, or keywords 308. Additionally, the command "NAME(BIG)," as depicted, is not a nested command of "DISPLAY" but rather is on the same level (indicated by the parenthesis nesting) as "DISPLAY."

Figure 4:
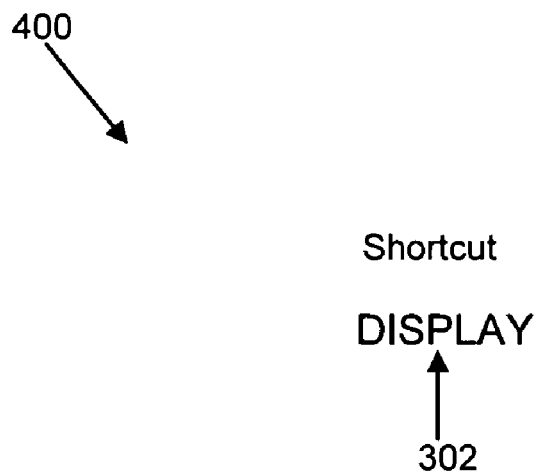
FIG. 4 is a schematic block diagram illustrating one embodiment of a shortcut command in accordance with the present invention.

FIG. 4 is a schematic block diagram illustrating one embodiment of a shortcut command 400 in accordance with the present invention. As described above, a shortcut 400 may be defined by the user and maintained by the shortcut module 204. In one embodiment, the user may predefine the default parameters 306 associated with the verb 302. For example, when the user enters "Display" the SPOC module 106 is configured to replace "DISPLAY" with the predefined parameters "DISPLAY (NAME, SIZE(x), COLOR(r)) NAME (big)" as illustrated with respect to FIG. 3. Additionally, the shortcut may be defined for any verb 302 or Keyword 308 and is not limited to the verb 302 "display" which is given herein by way of example only. This enables the user to customize common commands and significantly reduce the amount of manual input required to issue the common commands.

Figure 5:
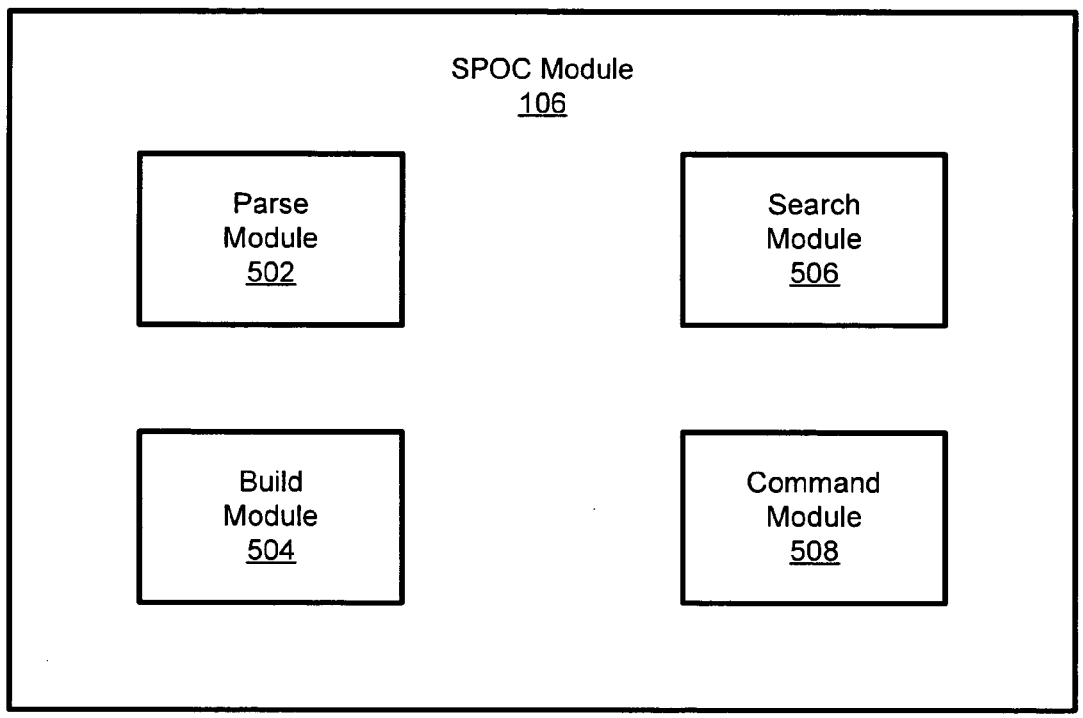
FIG. 5 is a schematic block diagram illustrating one embodiment of the SPOC module in accordance with the present invention.

FIG. 5 is a schematic block diagram illustrating one embodiment of the SPOC module 106 in accordance with the present invention. In one embodiment, the SPOC module 106 comprises a parse module 502, a build module 504, a search module 506, and a command module 508. The parse module 502 is configured to receive a command string having multiple nested manual parameters and to identify manual parameters within the command string. The parse module 502 is further configured to examine each character in the command string to identify tokens that match commands or keywords. The parse module 502 then compares the identified tokens with the commands or keywords defined in the shortcuts module 204. A token, as used herein, is a segment of text and may comprise alphanumeric characters.

The build module 504 cooperates with the parse module 502 to generate a parameter tree having manual parameter nodes. As the parse module 502 identifies a new parameter in the command string, the build module 504 generates a new parameter node for the parameter tree. Additionally, the build module 504 is configured to link the newly created parameter node to a parent parameter node. The parameter node has a parent parameter node if the parameter is nested within another command. For example, in the command "DISPLAY (NAME, CLASS)," the parent node would be "DISPLAY" and "NAME" AND "CLASS" would be separate nodes that link to "DISPLAY."

The manual parameter nodes, in one embodiment, may represent a single manually entered parameter. The parameter tree may also comprise predefined parameter nodes such as the parameter 306 of FIG. 3. Similarly, the build module 504 is configured to generate predefined parameter nodes from the predefined parameters or shortcuts defined by the user. In a further embodiment, the build module is configured to generate a plurality of parameter trees. For example, the build module 502 may generate a manual parameter tree and a predefined parameter tree. In one embodiment, the tree may be represented as a linked list, an array, a lookup table, etc. In a further embodiment, the tree may include a root, or a first node from which all parsed nodes are linked. One example of a tree structure will be given below with reference to FIG. 7.

In one embodiment, the build module 504 creates a descendent level of manual parameter nodes within the parameter tree for each nested level of manual parameters. Furthermore, the build module 504 is also configured to create a descendent level of predefined parameter nodes within the parameter tree for each nested level of the predefined parameters. In a further embodiment, the build module 504 cooperates with the parse module 502 to generate the parameter tree. For example, as the parse module 502 parses a command stream and encounters what is known as an "opening parens" the build module 504 creates a new descendent level of the parameter tree. Parameters subsequently found before a "closing parens" are placed on the same level of the parameter tree and may be referred to as "sibling nodes." The "closing parens" found by the parse module 502 is a signal to the build module 504 to ascend one level in the parameter tree The search module 506 compares manual parameter nodes to predefined parameter nodes to identify parameter nodes having a matching parameter context. A matching parameter context is a match between a manual parameter node and a predefined parameter node on the same parameter nesting level. The search module 506 identifies the parameter context match by identifying a match between a parent node of the manual parameter node and a parent node of the predefined parameter node. Each node may comprise a token that uniquely identifies the parameter. The match between the parent node of the manual parameter node and the parent node of the predefined parameter node may comprise matching tokens of the parent node of the manual parameter node and the parent node of the predefined parameter node.

The command module 508 is configured to generate a command string comprising the parameter of at least one manual parameter node. The parameter context match comprises a manual parameter that represents the same meaning as a predefined parameter such that the manual parameter overrides the predefined parameter in defining the command string. A non-matching parameter context comprises a predefined parameter having no corresponding manual parameter such that the command string should include the predefined parameter.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
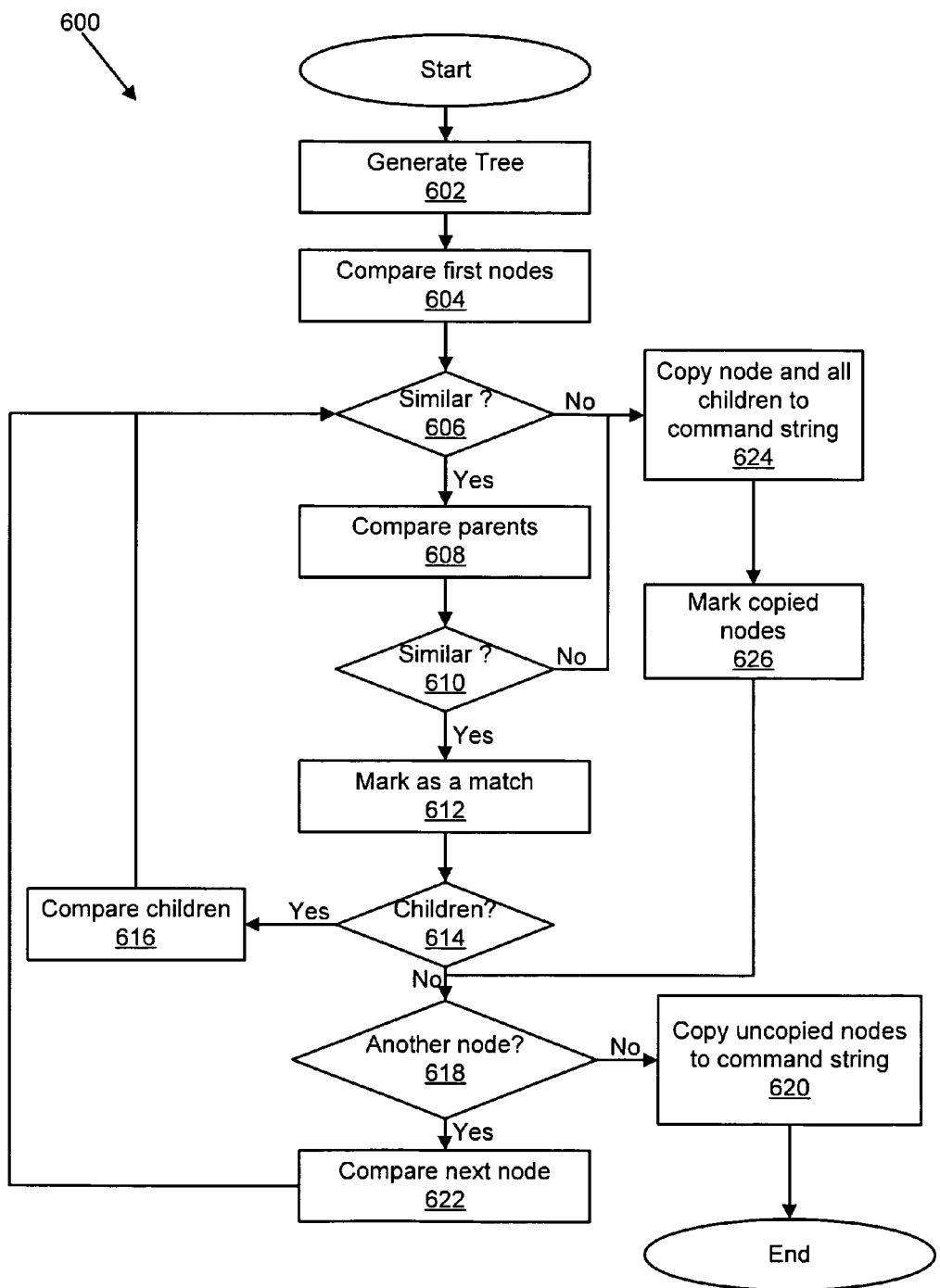
FIG. 6 is a schematic flow chart diagram illustrating one embodiment of a method for merging manual parameters with predefined parameters.

FIG. 6 is a schematic flow chart diagram illustrating one embodiment of a method 600 for merging manual parameters with predefined parameters. In one embodiment the method 600 starts and the parse module 502 receives a command, extracts the parameters 306 and passes the parameters 306 to the build module 504. The build module 504 may generate 602 the parameter tree. In one embodiment, the build module 504 generates 602 a single parameter tree having multiple nodes. The root of the parameter tree may be empty. The root may include two child branches. The first child branch may comprise all predefined parameter nodes and the second branch may comprise all manual parameter nodes. As the build module 504 encounters a nested verb 302, keyword 308, or parameter 306, the build module 504 creates a descendent level in the parameter tree for the appropriate branch. The parameter 306 becomes a child parameter node when the parameter 306 is located within the parenthesis 304 of a verb 302, another parameter 306, or a keyword 308.

In an alternative embodiment, the build module 504 may be configured to generate 602 two separate parameter trees. For example, the build module 504 may generate a manual parameter tree and a predefined parameter tree. Upon generating 602 the tree(s), the search module 506 begins at the root of the tree to search descendent parameter nodes for similar nodes. In one embodiment, similar nodes refers to one manual parameter node and one predefined parameter node that have a matching parameter context. A matching parameter context means that the manual parameter node and predefined parameter node are semantically the same. The semantic similarity means that tokens identifying the manual parameter node and predefined parameter node match and the manual parameter node and predefined parameter node share the same level in the nesting of parameters.

The search module 506 compares 604 each predefined parameter node to each manual parameter node. Preferably, the search module 506 begins by selecting the predefined parameter node branch. The search module 506 selects a first predefined parameter node and compares this first predefined parameter node to each manual parameter node in the manual parameter node branch. If the search module 504 finds 606 similar nodes the search module 506 compares 608 the parent nodes of the similar nodes. If the parent nodes are similar 610 the search module 506, in one embodiment, marks 612 the similar nodes (the predefined parameter node and similar manual parameter node) as a match and continues the search by next probing for children nodes of the most recently compared nodes.

If the first predefined parameter node has children 614, the search module 504 compares 616 the child nodes, in turn, to each manual parameter node and if similar 606 returns to compare 608 the parent nodes of these children and the similar manual parameter node. This recursive-style depth-first traversal continues until there are no children 614 in the predefined parameter branch. If there are no other predefined parameter nodes 618 in the predefined parameter branch, the command module 508 copies 620 unmarked manual parameter nodes to the command string and the method 600 ends.

However, if there are sibling nodes 618 that are unmarked the search module 504 compares 622 the next sibling node. When a predefined parameter node has no matches with a respective manual parameter node, the predefined parameter node and all children of the predefined parameter node are copied 624 to the command string. In one embodiment, the search module 504 then marks 626 the copied predefined parameter node and the copied children predefined parameter nodes to prevent the nodes from being copied in subsequent passes through the parameter tree. In one embodiment, the copied predefined parameter nodes are added to the original command string.

Alternatively, the parameter nodes of the parameter tree are used to create a new command string. In yet another embodiment, copied parameter nodes may be removed from the parameter tree rather than marked. However, in a preferred embodiment, there is no order requirement for the manual parameters supplied. Consequently, the parameter nodes are marked in the event that a manual parameter having a matching parameter context to a marked parameter node is encountered later in the original command string.

Figure 7:
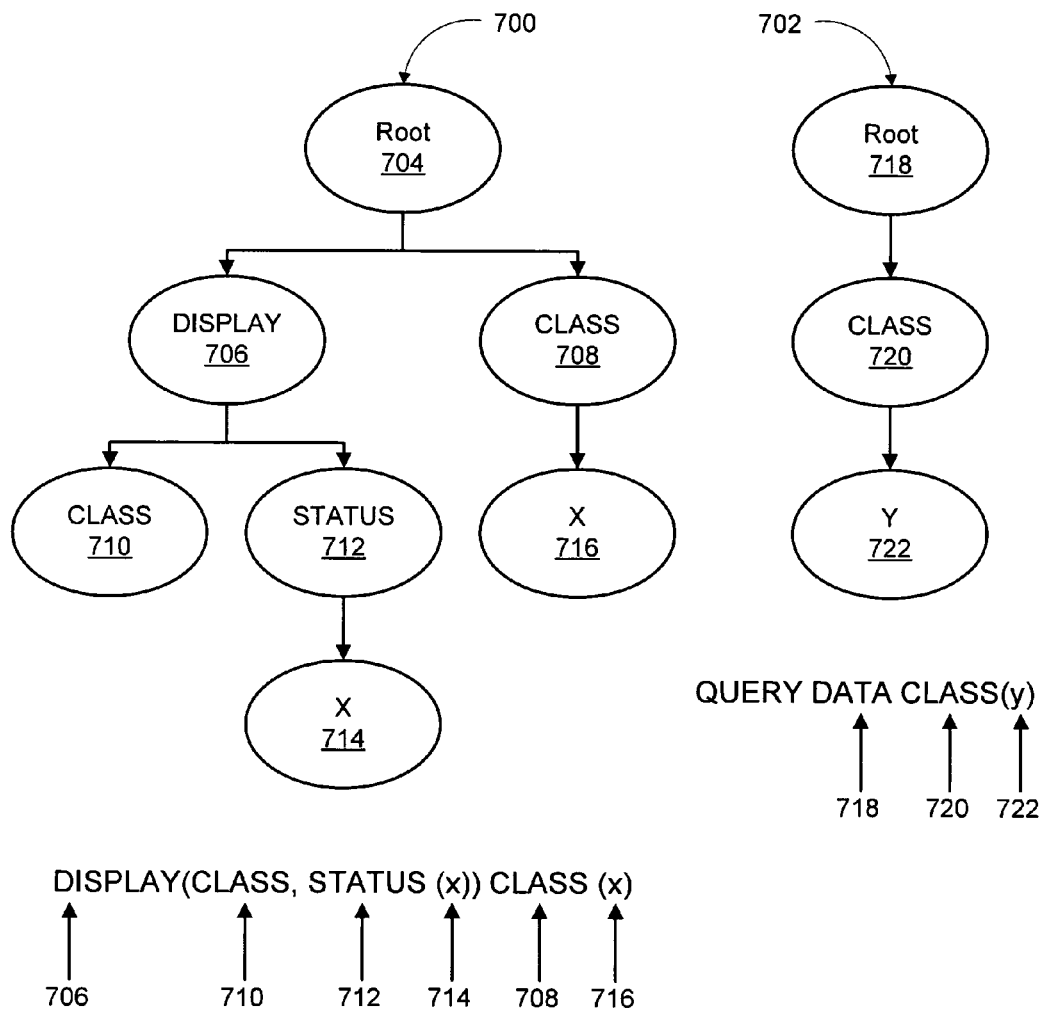
FIG. 7 is a schematic block diagram illustrating one embodiment of parameter trees in accordance with the present invention.

FIG. 7 is a schematic block diagram illustrating one embodiment of parameter trees 700, 702 in accordance with the present invention. For example, if the user has predefined a shortcut for "QUERY DATA" and the corresponding predefined parameters are "DISPLAY (CLASS, STATUS (x)) CLASS (x)." The resulting predefined parameter tree may comprise a root 704, and two top level nodes DISPLAY 706 and CLASS 708. In this example, the second instance of "CLASS (x)" in the predefined parameter string is on the same level as "DISPLAY" because it is outside the parenthesis of "DISPLAY." DISPLAY 706 has nested parameters CLASS 710 and STATUS 712 with STATUS 712 having an additional parameter X 714. In the depicted embodiment, CLASS 708 also has a child or nested parameter X 716.

If the user enters the command QUERY DATA, the SPOC module 106 is configured to append the predefined parameters, in this example DISPLAY (CLASS, STATUS (x)) CLASS (x), and send the command to the IMS 104 for processing. Unlike conventional systems, if the user enters a manual parameter the SPOC module 106 is configured to merge the manual parameter with the predefined parameters.

For example, if the user enters the command QUERY DATA CLASS (y), the parse module 502 extracts the parameter "CLASS (y)" and the build module 504 generates the manual parameter tree 702 and the predefined parameter tree 700. The manual parameter tree 702 may comprise the root 718, the CLASS 720 and the child or nested parameter node Y 722. The search module 506 then begins to compare the nodes of the predefined parameter tree 700 with the nodes of the manual parameter tree 702.

The search module 506 starts with the DISPLAY node 706 and looks for parameter context matches in the manual parameter tree 702 at the same level. In this example, there are no matches for the DISPLAY node 706, so DISPLAY 706 and the children nodes 710, 712, 714 are copied to the command string and are marked as copied. The search module 506 then moves to the next node, which in this example is CLASS 708.

The search module 506 compares CLASS 708 with nodes of the same level on the manual parameter tree 702 and finds a matching CLASS 720 node. The search module 506 then compares the parent nodes, which in this case are both ROOT 704, 718. The search module 506 has found a match, and subsequently compares the children nodes 716, 722. In this example, the children nodes X 716 and Y 722 do not match so the search module copies the manually entered parameter Y 722 to replace X 716. The resulting command string, in the depicted embodiment, would be DISPLAY (CLASS, STATUS (X)) CLASS (Y).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for merging manual parameters with predefined parameters in an Information Management System (IMS), the system comprising:

an Information Management System (IMS) configured to manage one of a hierarchical database and a transaction management system;

a Time Sharing Options (TSO) Single Point of Control (SPOC) module for managing a plurality of IMSs by way of manually entered commands on a command line to control the plurality of IMSs from a single console;

a parse module configured to receive a command string having multiple nested manual parameters and configured to identify manual parameters within the command string;

a build module configured to generate a parameter tree having manual parameter nodes, each manual parameter node representing one manual parameter, the parameter tree further comprising predefined parameter nodes, each predefined parameter node representing one predefined parameter;

a search module configured to compare manual parameter nodes to predefined parameter nodes to identify parameter nodes having a matching parameter context, a matching parameter context comprising a context wherein a manual parameter node matches a predefined parameter node on the same parameter nesting level; and a command module configured to generate a command string comprising at least one manual parameter from a manual parameter node having a matching parameter context.

2. The system of claim 1, wherein the search module identifies the parameter context match by identifying a match between a parent node of a manual parameter node and a parent node of a predefined parameter node, the manual parameter node and predefined parameter node having matching tokens that identify the manual parameter node and the predefined parameter node.

3. The system of claim 2, wherein the match between the parent node of the manual parameter node and the parent node of the predefined parameter node comprises matching tokens of the parent node of the manual parameter node and the parent node of the predefined parameter node.

4. The system of claim 1, wherein the parameter context match comprises a manual parameter that represents the same meaning as a predefined parameter such that the command module overrides the predefined parameter with the manual parameter in defining the generated command string.

5. The system of claim 1, wherein the non-matching parameter context comprises a predefined parameter having no corresponding manual parameter such that the command module includes the predefined parameter in the command string.

6. The system of claim 1, wherein the search module traverses the parameter tree in order according to a depth-first traversal protocol.

7. The system of claim 1, wherein the search module is configured to mark a manual parameter node having a matched parameter context and a predefined parameter node having a non-matching parameter context such that the command module can readily identify matched parameter context nodes and non-matching parameter context nodes.

8. The system of claim 1, wherein the build module is configured to create a descendent level of manual parameter nodes within the parameter tree for each nested manual parameter and create a descendent level of predefined parameter nodes within the parameter tree for each nested predefined parameters.

9. A method for merging manual parameters with predefined parameters, the method comprising:

receiving a command string having a plurality of nested manual parameters and identifying manual parameters within the command string;

generating a parameter tree having manual parameter nodes, each manual parameter node representing one manual parameter, the parameter tree further comprising predefined parameter nodes, each predefined parameter node representing one predefined parameter;

comparing manual parameter nodes to predefined parameter nodes to identify parameter nodes having a matching parameter context, a matching parameter context comprising a context wherein a manual parameter node matches a predefined parameter node on the same parameter nesting level; and generating a command string comprising at least one manual parameter from a manual parameter node having a matching parameter context and at least one predefined parameter from a predefined parameter node having a non-matching parameter context.

10. The method of claim 9, further comprising identifying the parameter context match by identifying a match between a parent node of a manual parameter node and a parent node of a predefined parameter node, the manual parameter node and predefined parameter node having matching tokens that identify the manual parameter node and the predefined parameter node.

11. The method of claim 10, further comprising matching tokens of the parent node of the manual parameter node and the parent node of the predefined parameter node.

12. The method of claim 9, further comprising overriding the predefined parameter in generating the command string.

13. The method of claim 9, further comprising including the at least one predefined parameter from a predefined parameter node having a non-matching parameter context in the generated command string.

14. The method of claim 9, further comprising traversing the parameter tree in order according to a depth-first traversal protocol.

15. The method of claim 9, further comprising marking a manual parameter node having a matched parameter context and a predefined parameter node having a non-matching parameter context such that the matched parameter context nodes and non-matching parameter context nodes can readily identified.

16. The method of claim 9, further comprising creating a descendent level of manual parameter nodes within the parameter tree for each nested level of manual parameters and creating a descendent level of predefined parameter nodes within the parameter tree for each nested level of predefined parameters.

17. A computer programmed product comprising a tangible storage medium tangibly embodying a program of machine-readable instructions executable by a digital processing apparatus to perform an operation for merging manual parameters with predefined parameters, the operation comprising:

receiving a command string having a plurality of nested manual parameters and identifying manual parameters within the command string;

generating a parameter tree having manual parameter nodes, each manual parameter node representing one manual parameter, the parameter tree further comprising predefined parameter nodes, each predefined parameter node representing one predefined parameter;

comparing manual parameter nodes to predefined parameter nodes to identify parameter nodes having a matching parameter context, a matching parameter context comprising a context wherein a manual parameter node matches a predefined parameter node on the same parameter nesting level; and generating a command string comprising at least one manual parameter from a manual parameter node having a matching parameter context and at least one predefined parameter from a predefined parameter node having a non-matching parameter context.

18. The computer programmed product of claim 17, further comprising identifying the parameter context match by identifying a match between a parent node of a manual parameter node and a parent node of a predefined parameter node, the manual parameter node and predefined parameter node having matching tokens that identify the manual parameter node and the predefined parameter node.

19. The computer programmed product of claim 18, further comprising matching tokens of the parent node of the manual parameter node and the parent node of the predefined parameter node.

20. The computer programmed product of claim 17, further comprising overriding the predefined parameter in defining the generated command string.

* * * * *